United States Patent [19]
Tildesley

[11] 3,909,913
[45] Oct. 7, 1975

[54] METHOD OF JOINING SHEETS BY USE OF FASTENERS

[75] Inventor: James Matthew George Tildesley, Hilton, near Bridgnorth, England

[73] Assignee: Ocean Investments (Gibraltar) Limited, Gibraltar

[22] Filed: June 24, 1974

[21] Appl. No.: 482,450

[30] Foreign Application Priority Data
July 19, 1973 United Kingdom............... 34441/73

[52] U.S. Cl. .................. 29/432; 29/509; 29/520; 151/41.73
[51] Int. Cl.² ........................................ B23P 11/00
[58] Field of Search .......... 29/432, 432.1, 520, 509; 151/41.72, 41.73; 287/20.3

[56] References Cited
UNITED STATES PATENTS

| | | | |
|---|---|---|---|
| 1,275,576 | 8/1918 | Lockwood | 29/520 |
| 1,946,065 | 2/1934 | Dodge | 29/520 X |
| 2,177,191 | 10/1939 | Sandberg | 29/520 |
| 2,644,350 | 7/1953 | Regimbald | 151/41.73 |
| 3,571,903 | 3/1971 | Persson | 29/432.1 |
| 3,699,637 | 10/1972 | Rosiek | 29/432.1 |

FOREIGN PATENTS OR APPLICATIONS

| | | | |
|---|---|---|---|
| 1,007,084 | 10/1965 | United Kingdom | 29/432 |
| 706,088 | 3/1965 | Canada | 29/432 |

Primary Examiner—Victor A. DiPalma
Attorney, Agent, or Firm—Marshall & Yeasting

[57] ABSTRACT

The invention provides a fastener for use as a substitute for spot-welding and the like joining of sheet metal components, which is self-punching and self-clinching so that it can be installed by a single press operation, the fastener comprising a head and a shank, a groove around the shank towards the piercing tip of the same, and being used in combination with an installing tool or die which supports the components and surrounds the area to be punched out, the tool having an upstanding rib which embeds in the lower component to cause flow of metal into the groove.

3 Claims, 3 Drawing Figures

U.S. Patent  Oct. 7,1975  3,909,913

METHOD OF JOINING SHEETS BY USE OF FASTENERS

BACKGROUND OF THE INVENTION

One of the standard techniques for joining together two articles particularly of sheet metal is to spot weld the two together. This operation is relatively quick but is expensive, and if the articles are to be plated, painted or otherwise surface finished, has to be carried out at a relatively early stage in manufacture because the heat generated by the spot welding operation tends to scar the surface finish.

An alternative conventional method is therefore to use rivets, but this requires both of the articles (assuming that two are involved) to be pierced, the holes aligned, the rivet inserted through the holes and some system employed for expanding the rivet internally or peening over its free end and the number of separate operations involved tends to make this slower and hence also expensive. In addition, it is often required to have a joint free of protuberances, which may involve countersinking the holes and grinding off the heads at opposite ends of the rivet to leave these flush.

SUMMARY OF THE INVENTION

The object of the present invention is to provide a fastener which may be self-piercing and self-clinching to the articles with which it is employed, and hence to provide a fixing generally similar in effect to either rivetting or spot-welding, but in a manner which is cheaper, quicker and more convenient, in use, and for example which in some cases may be used with articles which have already been surface finished: a further object is to provide such a fastener which is flush headed without subsequent treatment.

Whilst the invention will primarily be of use for joining two articles together, for example two sheet metal pieces together, it is also possible to provide the fastener with some additional means at one end, for example with a screw-threaded stud portion which is to project from the article to which the fastener is secured, and in this event the invention may find use as a means of securing such screw-threaded studs or other means to a single sheet, although also to an assembly of two or more sheets.

The invention is based on a combination of three features, namely:
i. the adaptation of the shank of the rivet or like fastener so as to be self-piercing in sheet metal and like;
ii. the provision of at least one groove, recess or like in or around the shank near the self-piercing tip thereof and which can be filled with material from the article or component being pierced and to provide an axial hold for the rivet or fastener; and
iii. the use of a tool for supporting the article during piercing and having a projection to enter into the pierced material about the fastener shank to cause displacement of material from around the pierced hole and into said groove or like.

The fastener may be made by a cold forming technique or alternatively it may be machined for example from steel and subsequently case hardened and for example, zinc plated for aesthetic reasons and for corrosion resistance. The extreme tip of the fastener is preferably planar and normal to the axis of the shank of the fastener, and the shank is preferably cylindrical over its length, apart from the recess and a head at the opposite end to the tip. The recess may be a peripheral groove, an indentation or flat, or more than one of any of these, for example. The material chosen for the fastener and its hardness and also the length of any plain cylindrical portion lying between said planar tip and the groove or like will depend upon the design parameters and the thickness and hardness of the materials to be pierced by the fastener in use. In general, the said cylindrical portion lying between the planar face and the groove will be the maximum length possible, so as to reinforce the rim of the planar portion which acts as a punch, without displacing the groove sufficiently far back along the shank so that it would be located out of the lower of two sheet metal components when rivetted together; the lower component being the one most remote from the head of the fastener and nearest to the tip of the same. Hence, the design parameters for a fastener according to the invention will depend (within a range of possibilities) upon the thickness of the sheets to be secured together and whether the thinner or thicker sheet is to be lowermost. This will be most critical with particularly short fasteners or particularly thin sheets.

Preferably a groove is used which is of V-shape with a 90° included angle between its flanks and with the flanks symmetrically disposed about a plane parallel to the planar tip of the shank and hence normal to the axis of the shank. The dimensions of the groove at least are related to the co-operating tool, and in general the volume of the projection on the tool will be at least equal to the volume of the groove and in some instances the volume of the projection may be a multiple of the volume of the groove. Effectively, when attempts are made to separate the two articles which may be fixed together by the fastener by a load applied axially of the fastener, the material displaced into the groove will be placed in shear, and the less the angle of each flank of the groove to a plane normal to the axis, the greater will be the vector resistance to shear of that material; however, the steeper angles of flanks improve flow of metal and hence result in better filled grooves, and the preferred 90° included angle is at present considered to be the best compromise for these purposes.

Displacement of metal into the groove is effected by the projection on the tool, which contacts the lower sheet, (where two or more sheets are sandwiched together and to be fastened by a single fastener) around the periphery of the hole to be punched through the sheets by the displacement of the fastener. The hole through the tool preferably tapers so as to diverge from the projection, and the projection is preferably a single continuous rib of rectangular or for example square cross-section. The tool acts as a die in conjunction with a fastener which acts as a punch, and the discs of severed material may be allowed to fall through the hole in the centre of the tool.

In general, the nearer the groove towards the punch-like tip of the fastener, the better the flow of material into the groove during the fastening action, but the rib should not be of sufficient height so that it overlaps the groove since it might then not only displace metal into the groove but tend to shear the displaced metal from the surrounding mass.

Experiments have shown that to some degree the appropriate tool design depends upon material thickness and hardness (of the sheets being fastened) and harder materials more resistant to metal flow may require greater ratios of projection volume to groove volume than softer materials.

Nevertheless, all of the design parameters discussed hereinbefore can to some extent be accommodated in a range of fasteners each of which is suitable for use with a predetermined total thickness of sheets to be fastened together (this thickness corresponding to the axial length of the fastener, since the fastener does not change in shape or length during installation) and which may comprise two sheets of the same thickness or (within limits) two sheets of different thickness arranged in either possible way. Where particularly thin sheets are employed and with specific fastener designs, it may be necessary to specify that the thicker one is located lowermost, or select a different design (differing in the position of the groove towards the tip).

The head of the fastener may comprise an enlarged planar shoulder to seat on the top face of the assembly of sheets or like, and this will be applicable particularly where the fastener is provided with a screw-threaded stud or some other expedient which is to extend away from the upper surface of the top sheet, or may comprise a countersunk flush head.

DESCRIPTION OF THE PREFERRED EMBODIMENT

Figure 1:
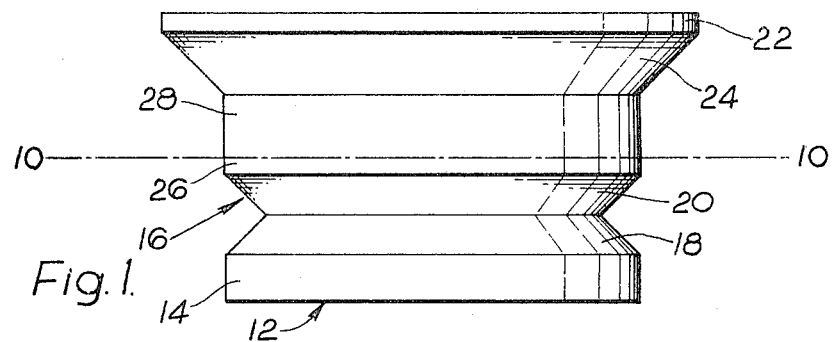
FIG. 1 is a greatly enlarged side elevation of a flush-ended rivet in accordance with the invention designed for use with a pair of sheet metal panels of like thickness.

For the purposes of illustration only, the fastener in FIG. 1 is illustrated in a form preferred for use with a pair of sheets of 0.036 inches thickness each. The plane where these two sheets are to meet face-to-face is indicated by the chain-dot line 10—10 of FIG. 1.

As seen in FIG. 1, the fastener comprises a planar end face 12 which serves as a punch, and is backed by a cylindrical portion 14 which, in the illustrated embodiment may be of 0.012 inches in axial length. The groove 16 extends around the complete periphery of the fastener and has two flanks 18, 20 at an included angle of 90° and these are symmetrically located with respect to a plane normal to the axis of the fastener. The total width of the groove at its maximum in this particular example is 0.020 inches.

The head end of the fastener comprises a narrow cylindrical portion 22 which may be 0.005 inches in axial length, and a countersunk portion 24 some 0.015 inches in axial length. Hence the shank comprises the portion 14, the groove 16 and a further cylindrical portion 26 which will also be received in the lowermost sheet lying below the line 10, 10 of FIG. 1 when the fastener is installed and which will be 0.004 inches in axial length in this embodiment, and a final portion 28 which will be 0.016 inches in axial length. The portions 28, 26, 14 are all of the same diameter and are plain cylindrical.

It is important that the fastener is made accurately without burrs and the like. As previously mentioned, the fastener may be machined from steel which is subsequently case hardened and then zinc plated.

Figure 2:
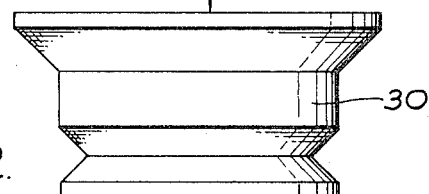
FIG. 2 is a diagrammatic view showing the first stage of an installation procedure.

The installation method shown in FIG. 2 comprises locating the fastener (indicated herein by the reference 30) on the sheets, in any desired position over the area of the sheets, and accurately aligning tool 32 therewith. The tool is provided with an approximately square section annular rib 34 on which the assembly of sheets rests. The fastener is then inserted by a single press applied force in the direction of arrow A FIG. 2, which shears discs out of the sheets to fall through the hole 36 and displaces the asseembly of sheets onto the rib 34 so as to create the indentation 38 (FIG. 3) and cause flow of metal into the groove to lock the fastener in position as seen in FIG. 3.

Figure 3:
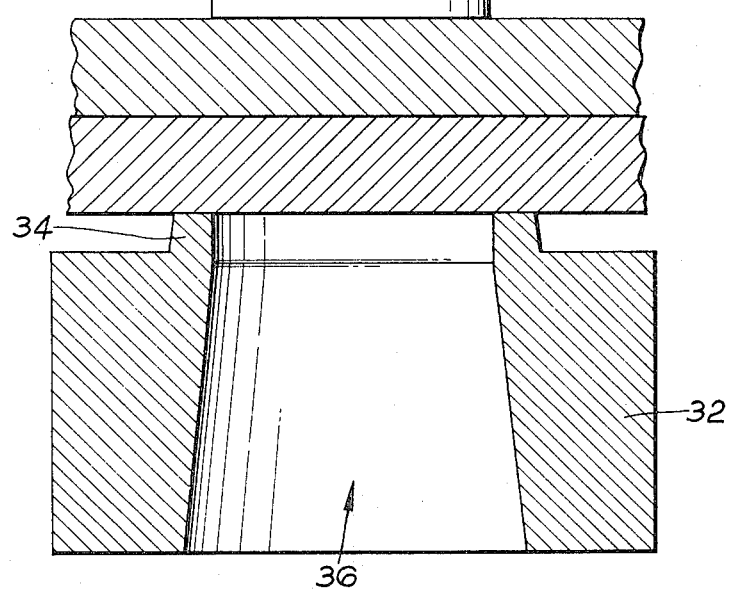
FIG. 3 is a sectional elevation of the installed fastener.
Figure 3:
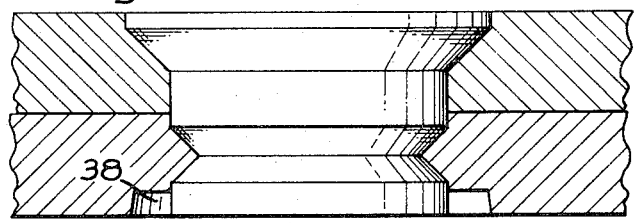

It will be noted from FIG. 3 that the fastener is flush with the sheets at both ends. The invention allows of considerable savings in time and expense in joining sheets because there is only a single operation in installation. It will be appreciated that the design allows installation in a single sheet where for example a screw-threaded stud is to project from the head 22, or a screw-threaded bore is to be provided as a nut: in such event the location of the groove is of less significance. Where more than two components are joined together, the groove will be located in the lowermost one.

What we claim is:

1. A method of joining an assembly of metal sheets, while punching an area from the assembly, that comprises the steps of supporting the assembly on a die having an assembly-supporting surface containing an opening which defines the area to be punched out and is bounded by a rib projecting from said supporting surface, and pressing into the assembly, in alignment with said opening, a fastener comprising a head, and a shank having a cross-section that coincides with said opening, and having a groove encircling the shank adjacent to the punch end thereof, the distance between the punch end of the shank and the adjacent edge of the groove being at least as great as the height of the rib, the volume of the rib being at least as great as the volume of the groove, the length of the fastener being equal to the thickness of the assembly, and the pressing stroke being long enough to insert the punch end of the fastener into said opening to a level even with said supporting surface, to bring the inserted fastener flush with both sides of assembly.

2. A method according to claim 1 wherein the fastener has a cross-section of uniform size and shape, and a punch end which is planar and normal to the axis of the shank.

3. A method according to claim 2 wherein the shank is of circular cross-section, the head comprises a countersunk portion, and the groove is of V section and lies wholly within the half of the length of the fastener adjacent the punch end.

* * * * *